(12) United States Patent
Rotem et al.

(10) Patent No.: US 11,815,979 B2
(45) Date of Patent: Nov. 14, 2023

(54) APPLICATION PRIORITY BASED POWER MANAGEMENT FOR A COMPUTER DEVICE

(71) Applicant: Intel Corporation, Santa Clara, CA (US)

(72) Inventors: Efraim Rotem, Haifa (IL); Eliezer Weissmann, Haifa (IL); Doron Rajwan, Rishon Lezion (IL); Yoni Aizik, Haifa (IL); Esfir Natanzon, Haifa (IL); Nir Rosenzweig, Givat Ella (IL); Nadav Shulman, Tel Mond (IL); Bart Plackle, Diest (BE)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 16/633,120

(22) PCT Filed: Aug. 22, 2017

(86) PCT No.: PCT/US2017/048059
§ 371 (c)(1),
(2) Date: Jan. 22, 2020

(87) PCT Pub. No.: WO2019/040050
PCT Pub. Date: Feb. 28, 2019

(65) Prior Publication Data
US 2021/0191494 A1 Jun. 24, 2021

(51) Int. Cl.
*G06F 1/329* (2019.01)
*G06F 9/48* (2006.01)

(52) U.S. Cl.
CPC .......... *G06F 1/329* (2013.01); *G06F 9/4893* (2013.01)

(58) Field of Classification Search
CPC .............................. G06F 1/329; G06F 9/4893
See application file for complete search history.

(56) References Cited

U.S. PATENT DOCUMENTS

| 9,557,792 | B1* | 1/2017 | Potlapally | G06F 1/3206 |
| 10,564,694 | B2* | 2/2020 | Guo | G06F 9/44 |
| 2004/0073822 | A1* | 4/2004 | Greco | G06F 1/329 |
| | | | | 713/320 |

(Continued)

FOREIGN PATENT DOCUMENTS

WO WO2013-049326 A2 4/2013

OTHER PUBLICATIONS

International Search Report and Written Opinion dated May 18, 2018 for International Patent Application No. PCT/US2017/048059, 14 pages.

*Primary Examiner* — Vincent H Tran
(74) *Attorney, Agent, or Firm* — Schwabe, Williamson & Wyatt, P.C.

(57) ABSTRACT

Embodiments include apparatuses, methods, and systems including a power control unit to control different power consumptions by one or more processors to operate different applications. The power control unit may receive power information that may include a priority information for each application to be operated on the one or more processors, determine to control, based on the power information for different applications, different power consumptions by the one or more processors to operate the different applications. Other embodiments may also be described and claimed.

24 Claims, 7 Drawing Sheets

(56) References Cited

U.S. PATENT DOCUMENTS

| | | | |
|---|---|---|---|
| 2005/0076253 A1* | 4/2005 | Lu | H04M 1/72445 713/320 |
| 2007/0008887 A1* | 1/2007 | Gorbatov | H04L 41/0893 370/230 |
| 2008/0057894 A1* | 3/2008 | Aleksic | H04W 52/0258 455/187.1 |
| 2008/0178019 A1* | 7/2008 | McGrane | G06F 1/26 713/320 |
| 2009/0307036 A1* | 12/2009 | Archer | G06F 1/3296 713/320 |
| 2009/0307696 A1* | 12/2009 | Vals | G06F 9/4893 718/102 |
| 2010/0169854 A1* | 7/2010 | Boselli | G06F 30/367 716/115 |
| 2010/0185882 A1* | 7/2010 | Arnold | G06F 9/4893 713/320 |
| 2010/0205137 A1* | 8/2010 | Barsness | G06F 1/3203 713/320 |
| 2010/0251253 A1 | 9/2010 | Pike | |
| 2011/0035203 A1* | 2/2011 | Dalton | G06F 30/20 703/14 |
| 2012/0023345 A1* | 1/2012 | Naffziger | G06F 1/324 713/320 |
| 2012/0047379 A1* | 2/2012 | Chen | G06F 1/26 713/320 |
| 2012/0210325 A1* | 8/2012 | de Lind van Wijngaarden | G06F 1/329 718/103 |
| 2012/0239949 A1* | 9/2012 | Kalyanasundaram | G06F 1/3212 713/320 |
| 2013/0024707 A1* | 1/2013 | Miwa | G06F 1/3225 713/320 |
| 2014/0032939 A1* | 1/2014 | Jeddeloh | G06F 1/329 713/300 |
| 2014/0317427 A1* | 10/2014 | Hill | G06F 1/3206 713/320 |
| 2014/0365790 A1* | 12/2014 | Chen | G06F 1/26 713/300 |
| 2015/0019889 A1* | 1/2015 | Banerjee | G06F 1/26 713/320 |
| 2015/0089249 A1* | 3/2015 | Hannon | G06F 9/5094 713/300 |
| 2015/0248312 A1* | 9/2015 | Brochard | G06F 9/4893 718/103 |
| 2015/0358810 A1* | 12/2015 | Chao | H04W 4/50 455/418 |
| 2016/0073351 A1* | 3/2016 | Cardozo | H04W 52/0258 455/574 |
| 2017/0090535 A1* | 3/2017 | Jeyapaul | G06F 1/329 |
| 2017/0185134 A1* | 6/2017 | Han | G06F 1/3212 |
| 2018/0032418 A1* | 2/2018 | Wang | G06F 11/3062 |
| 2018/0239641 A1* | 8/2018 | Kumar | G06F 9/5044 |

* cited by examiner

APPLICATION PRIORITY BASED POWER MANAGEMENT FOR A COMPUTER DEVICE

CROSS REFERENCE TO RELATED APPLICATIONS

The present application is a national phase entry under 35 U.S.C. § 371 of International Application No. PCT/US2017/048059, filed Aug. 22, 2017, entitled "APPLICATION PRIORITY BASED POWER MANAGEMENT FOR A COMPUTER DEVICE", which designated, among the various States, the United States of America. The entirety of the PCT/US2017/048059 Application is hereby incorporated by reference.

FIELD

Embodiments of the present invention relate generally to the technical field of computing, and more particularly to power management for a computer device.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

As integrated circuit (IC) fabrication technology improves, more and more functionalities and components are being integrated onto a computer device. Additional components and functionalities, together with increased performance demand, may consume more power and generate more heat for the computer device. Power management for a computer device is of increasing importance.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
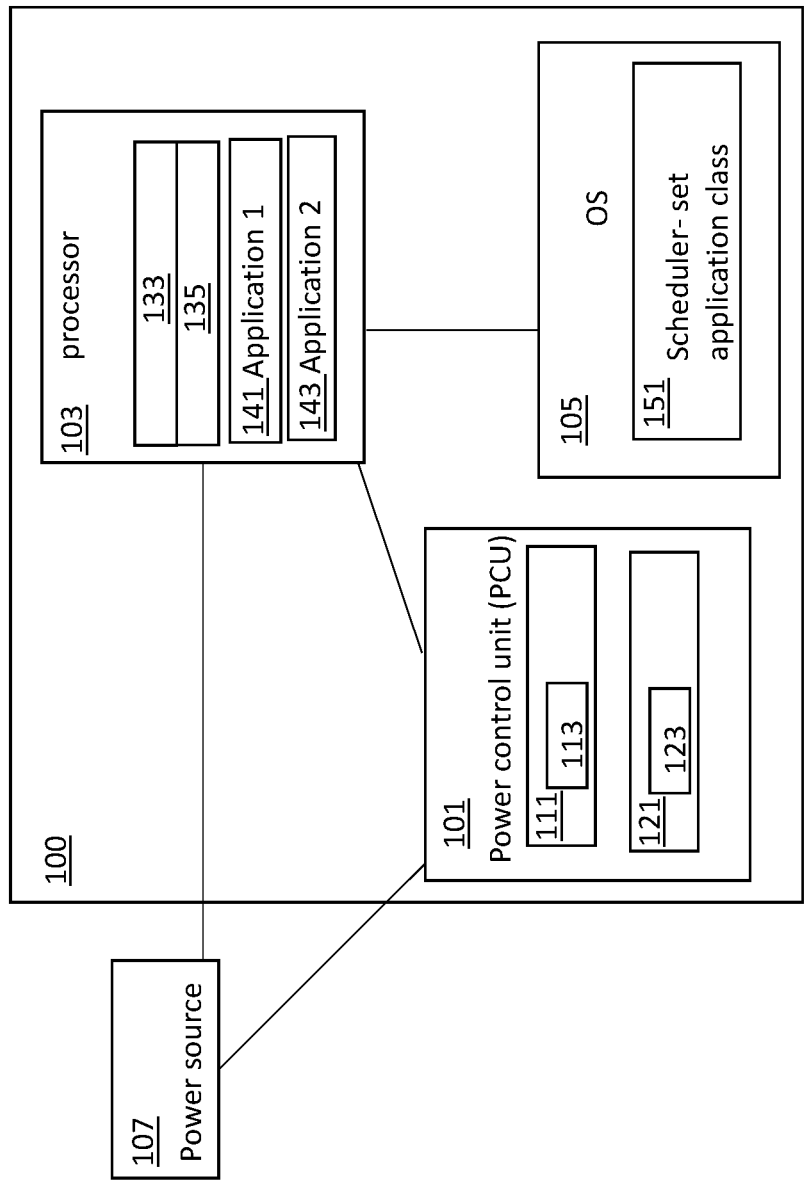
FIG. 1 illustrates an example computer device including a power control unit to control power consumptions by one or more processors to operate different applications based on power information, in accordance with various embodiments.

Many applications may be operated on one or more processors of a computer device. One application may have power consumption operational characteristics different from another application. For example, some applications may benefit from a "turbo" mode with increased power to the one or more processors to operate the applications. Some other applications, e.g., embedded applications, or Internet of Things (IoT) applications, may be operated on a fixed power resources, e.g., voltage or frequency. Increased power resources or consumption may provide little or no extra benefit to those embedded applications or IoT applications. Many current power management products and solutions control the power resources or consumption based on worst case conditions with regard to power consumption demand for various applications, which may fail to take into consideration of different operational characteristics for power consumption for different applications, and fail to achieve better power management for the computer device.

Power management for a computer device based on application priority as disclosed herein may classify different applications into different priority classes, and determine to control a power consumption for the application to be operated on one or more processors based on the application priority class. In doing so, the power management schemes disclosed herein may provide more power resources to important applications to improve the performance, while providing lower power resources to less important applications to keep the power consumption of the computer device low. In embodiments, the computer device may be a stand-alone computer device, an IoT device, a vehicle-embedded computer device (VECD), such as an autonomous or semi-autonomous driving vehicle (hereinafter, simply ADV) system, an engine/electronic control unit (ECU), an in-vehicle navigation system, and the like, or any other computer device.

In embodiments, a computer device may include one or more processors, and a power control unit coupled to the one or more processors. The power control unit may receive a first power information and a second power information. The first power information may include a first priority information for a first application to be operated on the one or more processors, and the second power information may include a second priority information for a second application to be operated on the one or more processors, where the first priority information may be different from the second priority information. The power control unit may determine to control a first power consumption based on the first power information for the first application to be operated on the one or more processors, and to control a second power consumption based on the second power information for the second application to be operated on the one or more processors.

In embodiments, a method for controlling a power source to a computer device with one or more processors may be disclosed. The method may include receiving a first power information including a first priority information for a first application to be operated on the one or more processors, and receiving a second power information including a second priority information for a second application to be operated on the one or more processors, where the first priority information may be different from the second priority information. Afterwards, the method may include determining to control a first power consumption of the one or more processors based on the first power information for the first application, and determining to control a second power consumption of the one or more processors based on the second power information for the second application.

In embodiments, one or more non-transitory computer-readable media comprising instructions to operate a power control unit of a computer device may be disclosed. In response to execution of the instructions by the power control unit, the power control unit may receive a first power information and a second power information. The first power information may include a first priority information for a first application to be operated on one or more processors of the computer device, and the second power information may include a second priority information for a second application to be operated on the one or more processors, where the first priority information may be different from the second priority information. The power control unit may further determine to control a first power consumption based on the first power information for the first application, and to control a second power consumption based on the second power information for the second application.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example computer device 100 including a power control unit 101 to control power consumptions by one or more processors, e.g., a processor 103, to operate different applications, e.g., an application 141 and an application 143, based on power information, in accordance with various embodiments. For clarity, features of the computer device 100 may be described below as an example for understanding an example computer device that may include a power control unit to control power consumptions by one or more processors to operate different applications based on power information. It is to be understood that there may be more or fewer components included in the computer device 100. Further, it is to be understood that one or more of the devices and components within the computer device 100 may include additional and/or varying features from the description below, and may include any devices and components that one having ordinary skill in the art would consider and/or refer to as the devices and components of a computer device.

In embodiments, the computer device 100 may include the power control unit 101, the processor 103, and the power source 107. In addition, the computer device 100 may include an operating system 105 for the processor 103. The power control unit 101 may be provided with a first power information 111, where the first power information 111 may include a first priority information 113, and optional additional information. The power control unit 101 may be provided with a second power information 121, where the second power information 121 may include a second priority information 123, and optional additional information. The first priority information 113 may be different from the second priority information 123. The processor 103 may be configured to hold a first power information 133, and a second power information 135, which may each be stored in a control register. In addition, the processor 103 may operate the first application 141, and the second application 143. The operating system 105 may include a scheduler 151. In embodiments, except for the teachings of the present disclosure, power control unit 101, the processor 103, the operating system 105, and the power source 107 may be any power control unit, processor, operating system, or power source that one having ordinary skill in the art would consider and/or refer to as a power control unit, a processor, an operating system, or a power source, respectively. In addition, there may be other devices or components, such as an input device, memory, a display device, not shown in FIG. 1 for the computer device 100.

In embodiments, the first power information 133 may be assigned by the scheduler 151 of the operating system 105, and may include power resource information for the first application 141. Similarly, the second power information 135 may be assigned by the scheduler 151, and may include power resource information for the second application 143. The power control unit 101 may receive the first power information 133 from a control register in the processor 103, and may store the received first power information as the first power information 111. Similarly, the power control unit 101 may receive the second power information 135 from a control register in the processor 103, and may store the received second power information as the second power information 121. More details of the first power information 111 or the second power information 121 may be shown in FIG. 2. The power control unit 101 may determine to control a first power consumption based on the first power information 111 for the first application 141, and to control a second power consumption based on the second power information 121 for the second application 143. More details of the operations by the power control unit 101 may be shown in FIG. 4.

In embodiments, the power source 107 may be a direct current (DC) power source or an alternating current (AC) power source to provide power to one or more components of the computer device 100, e.g., the processor 103. In some embodiments, the power source 107 may include one or more battery packs. The power source 107 may be coupled to components of the computer device 100 through a voltage regulator, not shown. Even though only one power source 107 is shown, additional power sources may be utilized. In some embodiments, the power control unit 101 may determine to control the power consumption based on the power information for the application by controlling the power source 107 to supply the processor 103 to operate the first application 141.

In embodiments, the computer device 100 may be a system on chip (SoC), integrating the power control unit 101, the processor 103, cache, random access memory (RAM), peripheral functions, or other functions onto one chip. In some embodiments, the power source 107 may be integrated with the processor 103 and the power control unit 101 as well. Alternatively, the computer device 100 may be a system integrated on a same circuit board to include the power control unit 101, the processor 103, and other components. The computer device 100 may be for various applications such as wireless communication, digital signal processing, security, and other applications. For example, the computer device 100 may be a VECD, such as a VECD shown in FIG. 7, an ECU, an in-vehicle navigation system, a wearable device, a smartphone, a computer tablet, a laptop, a game controller, a set-top box, an infotainment console, an IoT device, or others.

In embodiments, the processor 103 may be a central processing unit (CPU). In some embodiments, the processor 103 may be a programmable device that may execute a program, e.g., the application 141 or the application 143. In embodiments, the processor 103 may be a microcontroller, a 16-bit processor, a 32-bit processor, a 64-bit processor, a single core processor, a multi-core processor, a digital signal processor, an embedded processor, or any other processor. In addition, the processor 103 may include multiple cores. The processor 103 may operate at an operating frequency or a voltage. In some embodiments, the power control unit 101 may determine to control the power consumption based on the power information 111 for the application 141 by controlling the processor 103 to operate the first application 141 at a certain operating frequency or a voltage. In general, higher operating frequency or voltage by the processor 103 to operate the first application 141 may consume more power.

In embodiments, the operating system 105 may be any system software that manages hardware or software resources for the computer device 100, and may provide services to applications, e.g., the application 141 or the application 143. The operating system 105 may be Windows®, Android OS, iOS, Linux, a real-time operating system (RTOS), an automotive infotainment operating system, among others. For example, the operating system 105 may be a real-time operating system such as VxWorks, PikeOS, eCos, QNX, MontaVista Linux, RTLinux, Windows CE, or other operating system.

In embodiments, an application, e.g., the application 141 or the application 143, may be a thread of a program, or a component of a process, which may be a smallest sequence of programmed instructions that may be managed independently by the scheduler 151 of the operating system 105. The application 141 may be used an example for the description below. Any description for the application 141 may be equally applicable to the application 143. In some embodiments, the application 141 may include multiple threads executing concurrently on the processor 103. In embodiments, the application 141 may include a thread of a program for gathering data, a thread of a program for downloading traffic information, a thread of a program for in-vehicle infotainment, a thread of a program for assisted driving, a thread of a program for controlling an instrument panel, a thread of a program for controlling a camera, a thread of a program for controlling a sensor, or any other programs.

In embodiments, different applications may have different power consumption operational characteristics. The scheduler 151 included in the operating system 105 may maintain a list of power classes or application classes, and may further assign an individual application, such as the application 141, a power class or an application class. The first priority information 113 included in the first power information 111 may indicate such a power class for the application 141. The scheduler 151 may further assign to an application, e.g., the application 141, other computational resource or power resources, which may be shown in FIG. 2.

In embodiments, the application 141 may be of a quality of service (QoS) application class when the application 141 may utilize a fixed power supply, e.g., a fixed voltage or a fixed frequency power supply. For example, when the application 141 may be for an embedded computer device or an IoT device, the application 141 may be of a quality of service application class. When an embedded computer device or an IoT device may consume power at a frequency or voltage below a fixed frequency or voltage power supply, the embedded computer device or the IoT device may not be able to operate the application 141 to meet a quality of service specified for the application 141. On the other hand, when the embedded computer device or the IoT device may consume a power with a frequency or voltage higher than a fixed frequency or voltage power supply, there is little or no benefit to gain for the performance of the application 141 operated by the embedded computer device or the IoT device.

As another example, the application 141 may be of a quality of service application class for a network computer device, where the quality of service for the application 141 may be specified for a worst case traffic that the network computer device may encounter. If the network computer device may consume power at a frequency or voltage below a fixed frequency or voltage power supply, the network computer device may not be able to operate the application 141 to meet a quality of service specified for the application 141. On the other hand, there is no reason for the network computer device to consume a power with a frequency or voltage higher than a fixed frequency or voltage power supply to operate the application 141, since there is little to no benefit to gain for the performance of the application 141.

As yet another example, the application 141 may be of a quality of service application class when the application 141 may be a thread of a program for in-vehicle infotainment, or an entertainment task, e.g., video or audio playback, for in-vehicle infotainment, operated by an in-vehicle automotive system. If the in-vehicle automotive system may consume power at a frequency or voltage below a fixed frequency or voltage power supply, the in-vehicle automotive system may not be able to operate the entertainment task of the application 141. On the other hand, there is no reason for the in-vehicle automotive system to consume power at a frequency or voltage higher than a fixed frequency or voltage power supply to operate the application 141, since there is little to no benefit to gain to operate the application 141 with more power. The In embodiments, the application 141 may be of a mission critical application class, which may be operated constantly for important or fundamental functions of the computer device 100. For example, the application 141 may be a thread of a program for assisted driving, a thread of a program for controlling an instrument panel, or an autonomous driving task, operated by an in-vehicle automotive system. For an application of a mission critical application class, the application 141 may be allocated a guaranteed minimal computational resources and power resources, e.g., a minimal voltage or operating frequency for the processor 103, below which the application 141 may not be able to perform the desired task, e.g., an autonomous driving task, or controlling an instrument panel. In addition, the application 141 may benefit from more computational resources or power resources above the guaranteed minimal computational resources and power resources. For example, when the in-vehicle automotive system may consume more computational resources or power resources for the application 141, e.g., the autonomous driving task, or controlling an instrument panel, the application 141 may be able to perform autonomous driving task more accurately, and processing more information to make better decisions. Hence, the in-vehicle automotive system may consume power at a maximal allowable frequency or voltage, without impacting other tasks, to operate the application 141 when the application 141 may be of a mission critical application class.

In embodiments, the application 141 may be of a responsiveness application class, which may be operated in response to some external factors, and may last for a limited period of time when the external factors exist. For example, the application 141 may be a thread of a program for controlling a camera, or a thread of a program for controlling a sensor of a vehicle. An application of the responsiveness application class may have shorter duration. For example, a driver of a vehicle may activate a left turn light and may start to turn left. For a short time, the side camera or sensor of the vehicle may be turned on at full resolution, and the application 141 may control the camera or a sensor in the turning process. The application 141 may be of a responsiveness application class because it is in operation in response to the driver's left turn action. When the application 141 may be of a responsiveness application class, the application 141 may have similar power consumption operational characteristics as for a mission critical application class. The application 141 may be allocated a guaranteed minimal computational resources and power resources, e.g., a minimal voltage or operating frequency of the processor 103, and may further consume power at a maximal allowable frequency or voltage, without impacting other tasks. The power resource assigned to the application 141 may end when the vehicle finishes the left turn performed by the driver.

In embodiments, the application 141 may be of a background application class when the application 141 may play a supportive role to operate in the background. For example, the application 141 may be a program for gathering data, a thread of a program for downloading traffic information, operated by an in-vehicle automotive system as a background application. As a background application class, the application 141 may not have a firm deadline and may be operative at different times when spare computation resource and power resource is available. For example, the application 141 may be operated by the computer device 100 at a lowest possible frequency or voltage allowable by the power control unit 101 or the processor 103, without impacting any other applications operated by the processor 103.

In embodiments, the application 141 may be of a user experience application class when the application 141 may be allocated a flexible computational resources and power resources, and may dynamically adjust the power resource as long as power budget exists from the power source 107. As a user experience application class, the application 141 may not have a guaranteed minimal computational resources and power resources, e.g., a minimal voltage or operating frequency, different from an application of a mission critical application class or a responsiveness application class. As a user experience application class, the application 141 may benefit from more computational resources and power resources, further different from an application of quality of service application class. In addition, the application 141 may benefit from more than a lowest possible frequency or voltage allowable by the processor 103, hence different from an application of background application class.

The different power classes or application classes described above, e.g., a quality of service application class, a background application class, a user experience application class, a mission critical application class, or a responsiveness application class, are for examples only and are not limiting. There may be other additional or different kinds of power classes or application classes for the application 141. In some embodiments, the power classes or application classes may be represented by numeral values instead of descriptive terms, to represent the relative importance between different applications, so that the control unit 101 may assign different power resource based on the power classes or application classes. In embodiments, an application may belong to multiple application class, with the highest or most power sensitive class being controlling.

In embodiments, the power control unit 101 may determine to control a first power consumption based on the first power information 111 for the first application 141 to be operated on the processor 103, and to control a second power consumption based on the second power information 121 for the second application 143 to be operated on the processor 103. The power control unit 101 may determine to control the first power consumption based on the first power information 111 for the first application 141 by controlling the power source 107 to supply the processor 103, or by controlling an operating frequency or a voltage of the processor 103 to operate the first application 141. More details of the operations of the power control unit 101 may be illustrated in FIG. 4.

Figure 2:
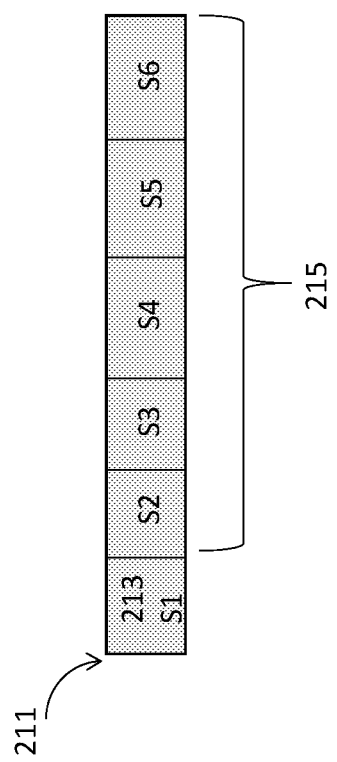
FIG. 2 illustrates an example power information stored in a control register to be used by a power control unit to control a power consumption by one or more processors to operate an application, in accordance with various embodiments.

FIG. 2 illustrates an example power information 211 stored in a control register to be used by a power control unit to control a power consumption by one or more processors to operate an application, in accordance with various embodiments. The power information 211 may be similar to the power information 111, the power information 121, the power information 133, or the power information 135, as shown in FIG. 1. The power information 211 may be stored in a control register to be used by the power control unit 101 to control a power consumption by the processor 103 to operate the application 141 or the application 143.

In embodiments, the power information 211 may include a priority information 213 and an optional additional information 215. The power information 211 may be stored in a 64-bit, 32-bit control register, or other size. The priority information 213 may take 12 bits, or 8 bits, while the additional information 215 may take up 52 bits, or 56 bits, or other number of bits according to the classes of applications operated on the computer device. In addition, the priority information 213 may be located at the most significant bits of the control register, the least significant bits of the control register, or somewhere in between.

In embodiments, the priority information 213 may be similar to the priority information 113, or the priority information 123, to operate the application 141 or the application 143, as shown in FIG. 1. In embodiments, the priority information 213 may indicate that the application may be of a power class selected from a quality of service application class, a background application class, a user experience application class, a mission critical application class, or a responsiveness application class. In some other embodiments, the priority information 213 may be assigned as a numeral value instead of a detailed name. For example, the priority information 213 may be an integer value between 1 to 10, or any other suitable range according to the applications operated on the computer device.

In embodiments, the additional information 215 may include a minimal allowable voltage, a maximal allowable voltage, a minimal allowable frequency, or a maximal allowable frequency for the application to be operated, as discussed for the various application classes. The additional information 215 may be further divided into multiple parts. As shown, the additional information 215 may be divided into five parts, a part S2, a part S3, a part S4, a part S5, and a part S6, each representing different parameters. For example, the part S2 may represent a guaranteed minimal computational resources and power resources that cannot be violated for an application of a mission critical application class. The part S3 may represent a maximal computational resources and power resources that there is no reason to exceed for the application. The part S4 may represent an energy performance preference that has no hard restrictions. The part S5 may represent a desired computational resource and power resource allocation for the application. The part S6 may represent a time window for the power information 211.

Figure 3:
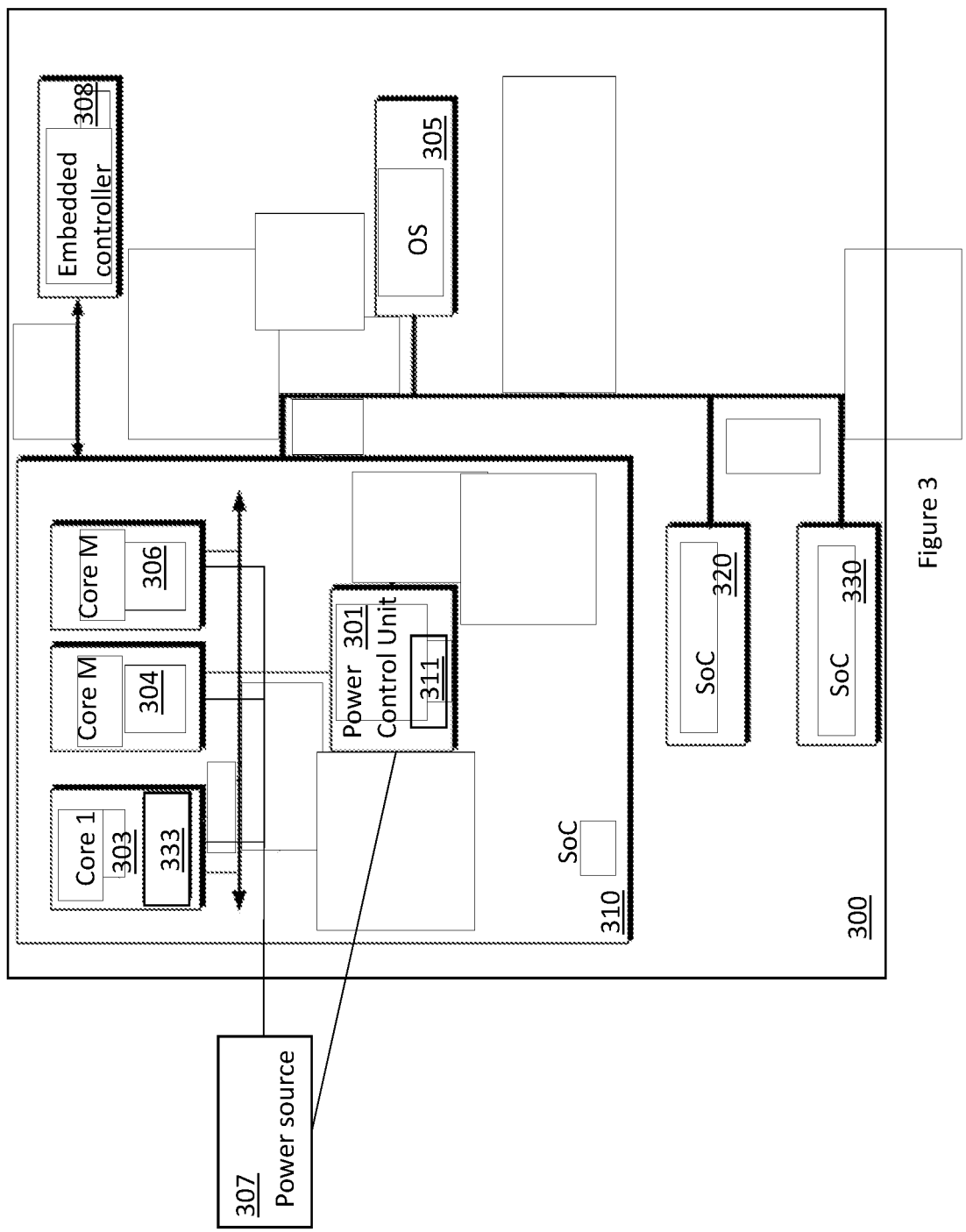
FIG. 3 illustrates another example computer device including a power control unit to control power consumptions by one or more processors to operate different applications based on power information, in accordance with various embodiments.

FIG. 3 illustrates another example computer device 300 including a power control unit 301 to control power consumptions by one or more processors, e.g., a processor 303, a processor 304, or a processor 306, to operate different applications based on power information, in accordance with various embodiments. The power control unit 301 and the processor 303 may be similar to the power control unit 101 and the processor 103 as shown in FIG. 1.

In embodiments, the computer device 300 may be for various applications such as wireless communication, digital signal processing, security, and other applications. For example, the computer device 100 may be a VECD, such as a VECD shown in FIG. 7, an ECU, an in-vehicle navigation system, a wearable device, a smartphone, a computer tablet, a laptop, a game controller, a set-top box, an infotainment console, an IoT device, or others.

In embodiments, the power control unit 301, the processor 303, the processor 304, and the processor 306 may be integrated onto a SoC 310. In addition, the computer device 300 may further include additional SoC, e.g., a SoC 320, and a SoC 330, which may be similar to the SoC 310. For example, the SoC 320 or the SoC 330 may also include a power control unit and one or more processors. The computer device 300 may also include an embedded controller 308, and an operating system 305.

In embodiments, the power source 307 may be a direct current (DC) power source or an alternating current (AC) power source to provide power to one or more components of the computer device 300. In some embodiments, the power source 307 may include one or more battery packs. The power source 307 may be coupled to components of the computer device 300 through a voltage regulator, not shown. Even though only one power source 307 is shown, additional power sources may be utilized. For example, each of the processors, e.g., the processor 303, the processor 304, or the processor 306 may have corresponding power source. In addition, each SoC, e.g., the SoC 310, the SoC 320, and the SoC 330, may have its corresponding power source. In some embodiments, the power control unit 301 may determine to control the power consumption based on the power information for the application by controlling the power source 307 to supply the processor 303.

In embodiments, the power control unit 301 may include a power information 311. The power information 311 may be similar to the power information 111 as shown in FIG. 1, and may include a priority information. The power control unit 101 may also include additional power information, not shown. The processor 303 may include a power information 333, which may be similar to the power information 133 and may be stored in a control register. In addition, the processor 103 may operate one or more applications.

In embodiments, the operations of the power control unit 301, the processor 303, and the operating system 305 may perform similar operations as described for the power control unit 101, the processor 103, and the operating system 105, as demonstrated for FIG. 1. For example, the power information 333 may be assigned by a scheduler of the operating system 305, and may include power resource information for an application to be operated by the processor 303. The power control unit 301 may receive the first power information 333 from a control register in the processor 303, and may store the received first power information as the first power information 311. The power control unit 301 may determine to control a power consumption based on the power information 311 for an application.

Figure 4:
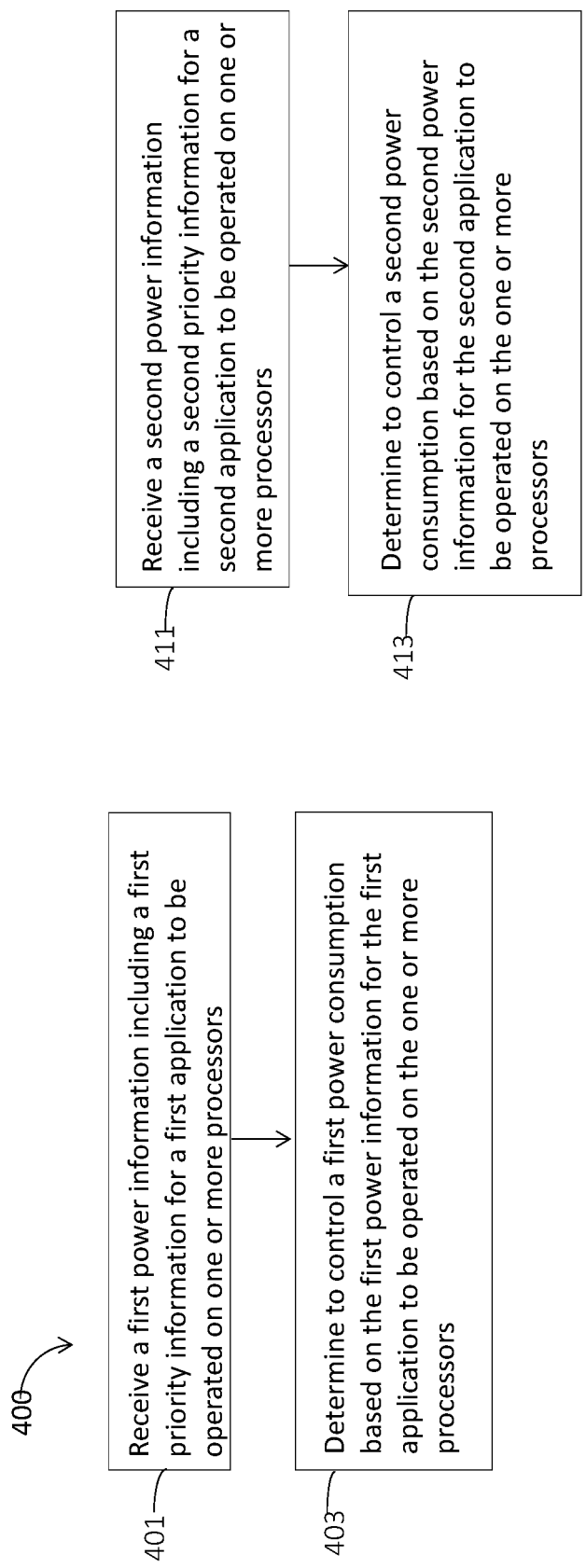
FIG. 4 illustrates an example process for a power control unit of a computer device to control a power consumption by one or more processors to operate an application based on power information, in accordance with various embodiments.

FIG. 4 illustrates an example process 400 for a power control unit of a computer device to control a power consumption by one or more processors to operate an application based on power information, in accordance with various embodiments. In embodiments, the process 400 may be a process performed by the power control unit 101 in FIG. 1, or the power control unit 301 in FIG. 3, based on a power information in the power information 111 or the power information 121 as shown in FIG. 1. The power information 111 or the power information 121 may have a format of the power information 211 as shown in FIG. 2. In embodiments, the process 400 may be a process performed by the power control unit of a VECD shown in FIG. 7.

The process 400 may start at an interaction 401 or an interaction 411. During the interaction 401, the power control unit may receive a first power information including a first priority information for a first application to be operated on one or more processors. For example, at the interaction 401, the power control unit 101 may receive the first power information 111 including the first priority information 113 for the first application 141 to be operated on the processor 103.

Similarly, during the interaction 411, the power control unit may receive a second power information including a second priority information for a second application to be operated on one or more processors. For example, at the interaction 411, the power control unit 101 may receive the second power information 121 including the second priority information 123 for the second application 143 to be operated on the processor 103.

During an interaction 403, the power control unit may determine to control a first power consumption of the one or more processors based on the first power information for the first application. For example, at the interaction 403, the power control unit 101 may determine to control a first power consumption of the processor 103 based on the first power information 111 for the first application 141.

Similarly, during the interaction 413, the power control unit may determine to control a second power consumption of the one or more processors based on the second power information for the second application. For example, at the interaction 413, the power control unit 101 may determine to control a second power consumption of the processor 103 based on the second power information 121 for the second application 143.

In embodiments, when the first priority information 113 included in the first power information 111 for the first application 141 is to indicate that the first application 141 is of a quality of service application class, the power control unit 101 may determine to consume a fixed frequency power as indicated by the first power information 111 to operate the first application 141, which may be indicated by the additional information included in first power information 111, to the processor 103 to operate the first application 141.

In embodiments, when the first priority information 113 included in the first power information 111 for the first application 141 is to indicate that the first application 141 is of a mission critical application class, the power control unit 101 may determine to consume power at a maximal allowable frequency, which may be indicated by the additional information included in the first power information 111, to the processor 103 to operate the first application 141.

In embodiments, when the first priority information 113 included in the first power information 111 for the first application 141 is to indicate that the first application 141 is of a background application class, the power control unit 101 may determine to consume power at a lowest possible frequency allowable by the power control unit 101 to operate the first application 141, which may be indicated by the additional information included in the first power information 111, to the processor 103 to operate the first application 141.

In addition, the power control unit 101 may perform other power management operations for the processor 103. For example, the power control unit 101 may detect a power, thermal, or current limit for the processor 103. Once such a power, thermal, or current limit is detected, the power control unit 101 may uniformly scale the power resources for all the applications operated by the processor 103 by a similar ratio. Additionally and alternatively, the power control unit 101 may selectively reduce the power resource or consumption to the processor 103 to operate different applications.

For example, when the first priority information 113 included in the first power information 111 for the first application 141 is lower than the second priority information 123 included in the second power information 121 for the second application 143, the power control unit 101 may reduce the first power consumption by the processor 103 to operate the first application 141, before the power control unit 101 is to reduce the second power consumption by the processor 103 to operate the second application 143. In embodiments, when the first priority information 113 is to indicate that the first application 141 is of a background application class, the first priority information 113 may have a lower priority compared to the second priority information 123, when the second priority information 123 is to indicate that the second application is of a user experience application class, a mission critical application class, or a responsiveness application class. Similarly, when the first priority information 113 is to indicate that the first application 141 is of a user experience application class, the first priority information 113 may have a lower priority compared to the second priority information 123, when the second priority information 123 is to indicate that the second application is of a mission critical application class.

Figure 5:
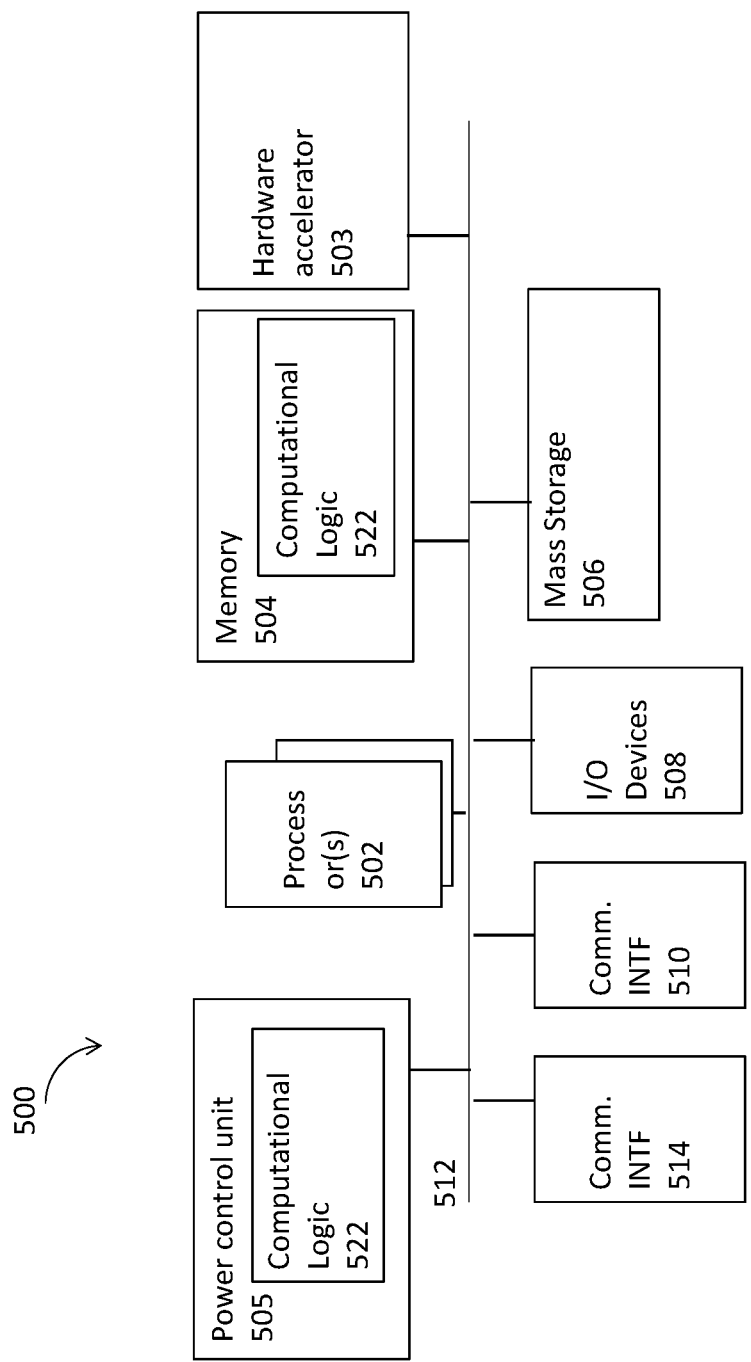
FIG. 5 illustrates an example computer device suitable for use to practice various aspects of the present disclosure, in accordance with various embodiments.

FIG. 5 illustrates an example computer device 500 that may be suitable as a device to practice selected aspects of the present disclosure. The device 500 may be an example of the computer device 100, or the computer device 300, as shown in FIG. 1 and FIG. 3, or a VECD shown in FIG. 7. As shown, the device 500 may include one or more processors 502, each having one or more processor cores, or and optionally, a hardware accelerator 503 (which may be an ASIC or a FPGA). In alternate embodiments, hardware accelerator 503 may be part of processor 502, or integrated together on a SOC. Additionally, the device 500 may include a memory 504, which may be any one of a number of known persistent storage medium, and mass storage 506. In addition, the 500 may include input/output devices 508. Furthermore, the device 500 may include communication interfaces 510 and 514. Communication interfaces 510 and 514 may be any one of a number of known communication interfaces. The elements may be coupled to each other via system bus 512, which may represent one or more buses. In the case of multiple buses, they may be bridged by one or more bus bridges (not shown). In addition, the device 500 may include a power control unit 505, which may be an example of the power control unit 101, or the power control unit 301, as shown in FIG. 1 and FIG. 3.

Each of these elements may perform its conventional functions known in the art. In particular, the power control unit 505 may be employed to store and host execution of programming instructions implementing the operations associated with controlling a power consumption based on power information for an application to be operated on the one or more processors, as described in connection with FIGS. 1-4, and/or other functions, collectively referred to as computational logic 522 that provides the capability of the embodiments described in the current disclosure. The various elements may be implemented by assembler instructions supported by processor(s) 502 or high-level languages, such as, for example, C, that can be compiled into such instructions. Operations associated with controlling a power consumption based on power information for an application to be operated on the one or more processors not implemented in software may be implemented in hardware, e.g., via hardware accelerator 503. Aspect of operations associated with controlling a power consumption based on power information for an application to be operated on the one or more processors not implemented in software, as described in connection with FIGS. 1-4, may be implements in the hardware accelerator.

The number, capability and/or capacity of these elements 502-522 may vary, depending on the number of other devices the device 500 is configured to support. Otherwise, the constitutions of elements 502-522 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 6:
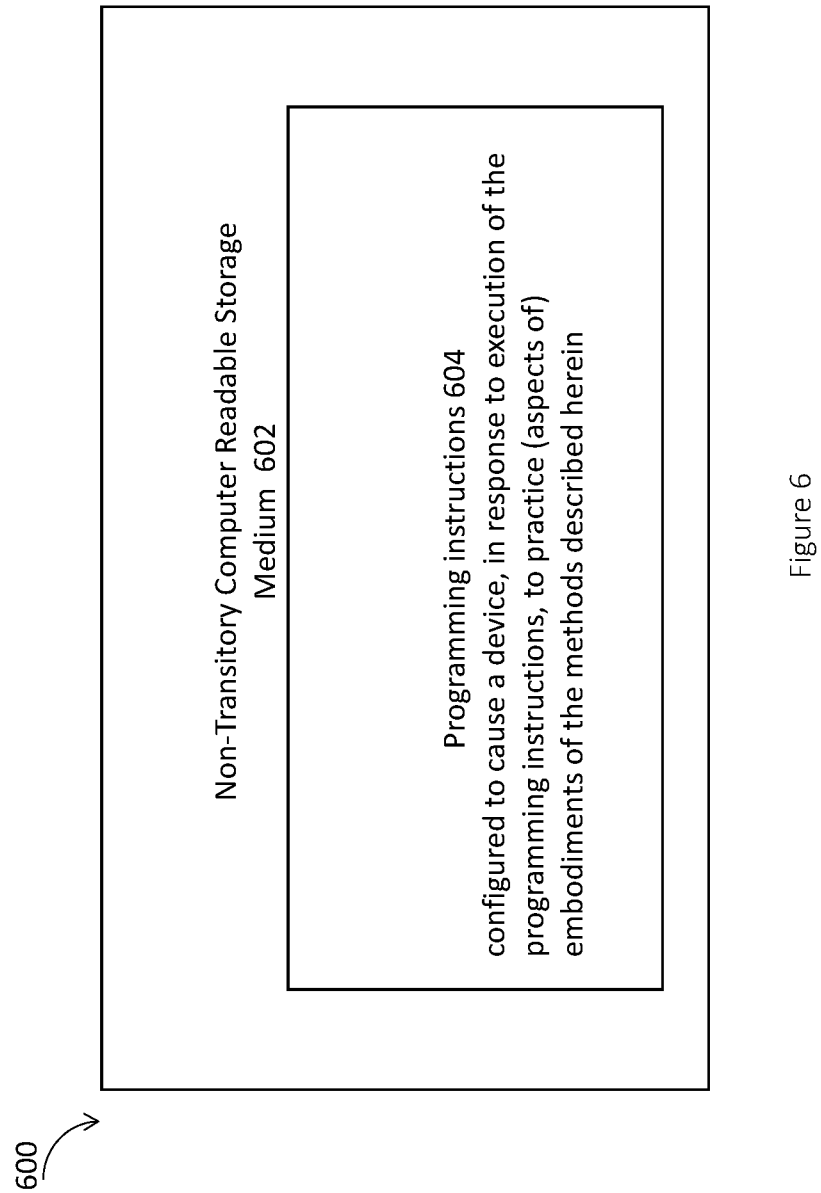
FIG. 6 illustrates a storage medium having instructions for practicing methods described with references to FIGS. 1-5, in accordance with various embodiments.

Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., device 500, in response to execution of the programming instructions in a power control unit, to perform, e.g., various operations associated with the power control unit 101, or the power control unit 301, as shown in FIG. 1 and FIG. 3.

In alternate embodiments, programming instructions 604 may be disposed on multiple computer-readable non-transitory storage media 602 instead. In alternate embodiments, programming instructions 604 may be disposed on computer-readable transitory storage media 602, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Figure 7:
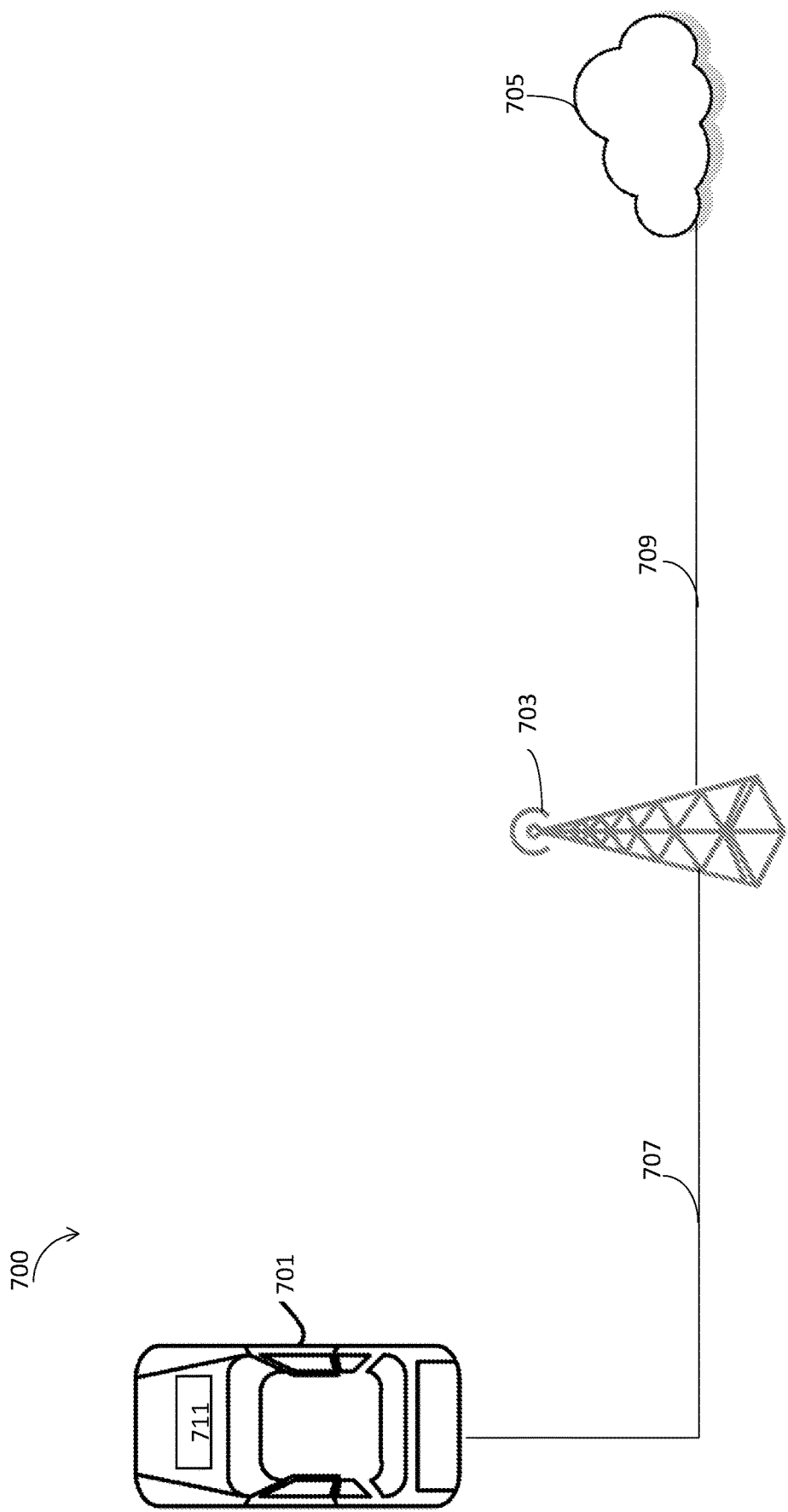
FIG. 7 illustrates an environment in which various embodiments described with references to FIGS. 1-6 may be practiced.

FIG. 7 illustrates an environment 700 in which various embodiments described with references to FIGS. 1-6 may be practiced. Environment 700 includes a vehicle 701, a wireless access node 703, and a cloud computing service 705 (also referred to as "cloud 705", "the cloud 705", and the like). The vehicle 701 may be an ADV having a VECD 711 with a power control unit to control power consumptions by one or more processors to operate different applications based on power information. For illustrative purposes, the following description is provided deployment scenarios including the vehicle 701 in a two dimensional (2D) freeway/highway/roadway environment. However, the embodiments described herein are also applicable to any type of vehicle, such as trucks, buses, motorcycles, boats or motorboats, and/or any other motorized devices with a power control unit to control power consumptions by one or more processors to operate different applications based on power information. For example, water vehicles such as boats, ferries, barges, hovercrafts, etc., may interact and/or communications in a same or similar manner as the vehicle 701 (e.g., using V2X circuitry and infrastructure), and such vehicles may also implement a power control unit to control power consumptions by one or more processors to operate different applications based on power information. The embodiments described herein may also be applicable to three dimensional (3D) deployment scenarios where the vehicle 701 may be implemented as flying objects, such as aircraft, drones, unmanned aerial vehicles (UAVs), and/or to any other like motorized devices.

The vehicle 701 may be any type of motorized vehicle or device used for transportation of people or goods, which may be equipped with controls used for driving, parking, passenger comfort and/or safety, etc. The terms "motor", "motorized", etc., as used herein may refer to devices that convert one form of energy into mechanical energy, and may include internal combustion engines (ICE), compression combustion engines (CCE), electric motors, and hybrids (e.g., including an ICE/CCE and electric motor(s)). Although FIG. 7 shows only a single vehicle 701, the vehicle 701 may represent a plurality of individual motor vehicles of varying makes, models, trim, etc., which may be collectively referred to herein as the "vehicle 701." In embodiments, the vehicle 701, as alluded to earlier, may include the VECD 711 (e.g., the computer device 100 shown and described with regard to FIG. 1 or the computer device 300 shown in FIG. 3). The VECD 711 may be any type of computer device that is mounted on, built into, or otherwise embedded in a vehicle and is capable of controlling power consumptions by one or more processors to operate different applications based on power information. In some embodiments, the VECD 711 may be a computer device used to control one or more systems of the vehicle 701, such as an ECU, ECM, embedded system, microcontroller, control module, EMS, OBD devices, DME, MDTs, etc.

The VECD 711 may include one or more processors (having one or more processor cores and optionally, one or more hardware accelerators), memory devices, communication devices, etc. that may be configured to carry out various functions according to the various embodiments discussed here. For example, the VECD 711 may be the computer device 500 shown in FIG. 5, and may execute instructions stored in a computer-readable medium, e.g., the computer-readable medium 602 as shown in FIG. 6, or may be pre-configured with the logic (e.g., with appropriate bit streams, logic blocks, etc.), to control power consumptions by one or more processors to operate different applications based on power information. The various methods, procedures, processes, etc. for controlling power consumptions by one or more processors to operate different applications based on power information is discussed infra with regard to FIGS. 1-6.

The data obtained by the VECD 711 may include sensor data from one or more sensors embedded in the vehicle 701, data packets from other VECD 711s included in other vehicles 701 (not shown), data packets and/or data streams from cloud 705 and/or network infrastructure (e.g., core network elements of a cellular communications network, etc.), navigation signaling/data from on-board navigations systems (e.g., global navigation satellite system (GNSS), global positioning system (GPS), etc.), and/or the like. In embodiments, the VECD 711 may also include, or operate in conjunction with communications circuitry and/or input/output (I/O) interface circuitry in order to obtain the data for the various sources.

The communications circuitry of the vehicle 701 may communicate with the cloud 705 via the wireless access node 703. The wireless access node 703 may be one or more hardware computer devices configured to provide wireless communication services to mobile devices (for example, VECD 711 in vehicle 701 or some other suitable device) within a coverage area or cell associated with the wireless access node 703. The wireless access node 703 may include a transmitter/receiver (or alternatively, a transceiver) connected to one or more antennas, one or more memory devices, one or more processors, one or more network interface controllers, and/or other like components. The one or more transmitters/receivers may be configured to transmit/receive data signals to/from one or more mobile devices via a link (e.g., link 707). Furthermore, one or more network interface controllers may be configured to transmit/receive with various network elements (e.g., one or more servers within a core network, etc.) over another backhaul connection (not shown). In embodiments, the VECD 711 may generate and transmit data to the wireless access node 703 over link 707, and the wireless access node 703 may provide the data to the cloud 705 over backhaul link 709. Additionally, during operation of the vehicle 701, the wireless access node 703 may obtain data intended for the VECD 711 from the cloud 705 over link 709, and may provide that data to the VECD 711 over link 707. The communications circuitry in the vehicle 701 may communicate with the wireless access node 703 in accordance with one or more wireless communications protocols as discussed herein.

As an example, the wireless access node 703 may be a base station associated with a cellular network (e.g., an eNB in an LTE network, a gNB in a new radio access technology (NR) network, a WiMAX base station, etc.), an RSU, a remote radio head, a relay radio device, a smallcell base station (e.g., a femtocell, picocell, home evolved nodeB (HeNB), and the like), or other like network element. In embodiments where the wireless access node is a base station, the wireless access node 703 may be deployed outdoors to provide communications for the vehicle 701 when the vehicle 701 is operating at large, for example when deployed on public roads, streets, highways, etc.

In some embodiments, the wireless access node 703 may be a gateway (GW) device that may include one or more processors, communications systems (e.g., including network interface controllers, one or more transmitters/receivers connected to one or more antennas, and the like), and computer readable media. In such embodiments, the GW may be a wireless access point (WAP), a home/business server (with or without radio frequency (RF) communications circuitry), a router, a switch, a hub, a radio beacon, and/or any other like network device. In embodiments where the wireless access node 703 is a GW, the wireless access node 703 may be deployed in an indoor setting, such as a garage, factory, laboratory or testing facility, and may be used to provide communications for while parked, prior to sale on the open market, or otherwise not operating at large.

In embodiments, the cloud 705 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the cloud 705 may be associated with network operator who owns or controls equipment and other elements necessary to provide network-related services, such as one or more base stations or access points (e.g., wireless access node 703), one or more servers for routing digital data or telephone calls (for example, a core network or backbone network), etc. Implementations, components, and protocols used to communicate via such services may be those known in the art and are omitted herein for the sake of brevity.

In some embodiments, the cloud 705 may be a system of computer devices (e.g., servers, storage devices, applications, etc. within or associated with a data center or data warehouse) that provides access to a pool of computing resources. The term "computing resource" may refer to a physical or virtual component within a computing environment and/or within a particular computer device, such as memory space, processor time, electrical power, input/output operations, ports or network sockets, and the like. In these embodiments, the cloud 705 may be a private cloud, which offers cloud services to a single organization; a public cloud, which provides computing resources to the general public and shares computing resources across all customers/users; or a hybrid cloud or virtual private cloud, which uses a portion of resources to provide public cloud services while using other dedicated resources to provide private cloud services. For example, the hybrid cloud may include a private cloud service that also utilizes one or more public cloud services for certain applications or users, such as providing obtaining data from various data stores or data sources. In embodiments, a common cloud management platform (e.g., implemented as various virtual machines and applications hosted across the cloud 705 and database systems) may coordinate the delivery of data to the VECD 711 of vehicle 701. Implementations, components, and protocols used to communicate via such services may be those known in the art and are omitted herein for the sake of brevity.

Thus various example embodiments of the present disclosure have been described including, but are not limited to:

Example 1 may include a computer device, comprising: one or more processors; a power control unit coupled to the one or more processors, wherein the power control unit is to: receive a first power information including a first priority information for a first application to be operated on the one or more processors, and a second power information including a second priority information for a second application to be operated on the one or more processors, wherein the first priority information is different from the second priority information; determine to control a first power consumption based on the first power information for the first application to be operated on the one or more processors, and to control a second power consumption based on the second power information for the second application to be operated on the one or more processors.

Example 2 may include the computer device of example 1, wherein the first priority information is to indicate that the first application is of a power class selected from a quality of service application class, a background application class, a user experience application class, a mission critical application class, or a responsiveness application class.

Example 3 may include the computer device of example 1, wherein the first power information further includes a minimal allowable voltage, a maximal allowable voltage, a minimal allowable frequency, or a maximal allowable frequency.

Example 4 may include the computer device of example 1, wherein the first application includes a thread of a program for gathering data, a thread of a program for downloading traffic information, a thread of a program for in-vehicle infotainment, a thread of a program for assisted driving, a thread of a program for controlling an instrument panel, a thread of a program for controlling a camera, or a thread of a program for controlling a sensor.

Example 5 may include the computer device of any one of examples 1-4, wherein the power control unit is to determine to control the first power consumption based on the first power information for the first application by controlling a power source to supply the one or more processors to operate the first application, or by controlling an operating frequency or a voltage of the one or more processors to operate the first application.

Example 6 may include the computer device of any one of examples 1-4, wherein the first power information including the first priority information for the first application is assigned by a scheduler of an operating system for the computer device, the first power information is stored in a control register in the one or more processors, and the power control unit is to receive the first power information from the control register.

Example 7 may include the computer device of any one of examples 1-4, wherein the power control unit is to determine for the one or more processors to consume a fixed frequency power as indicated by the first power information to operate the first application, and wherein the first priority information of the first power information is to indicate that the first application is of a quality of service application class.

Example 8 may include the computer device of any one of examples 1-4, wherein the power control unit is to determine for the one or more processors to consume power at a maximal allowable frequency as indicated by the first power information to operate the first application, wherein the first priority information of the first power information is to indicate that the first application is of a mission critical application class.

Example 9 may include the computer device of any one of examples 1-4, wherein the power control unit is to determine for the one or more processors to consume power at a lowest possible frequency allowable by the power control unit to operate the first application, wherein the first priority information of the first power information is to indicate that the first application is of a background application class.

Example 10 may include the computer device of any one of examples 1-4, wherein the computer device is an in-vehicle automotive system, a wearable device, a smartphone, a computer tablet, a laptop, a game controller, a set-top box, an infotainment console, or an Internet of Things (IoT) device.

Example 11 may include the computer device of any one of examples 1-4, wherein the power control unit is further to: detect a power, thermal, or current limit for the one or more processors; reduce the first power consumption to operate the first application before the power control unit is to reduce the second power consumption to operate the second application, wherein the first priority information included in the first power information for the first application is lower than the second priority information included in the second power information for the second application.

Example 12 may include the computer device of example 11, wherein the first application is of a background application class, and the second application is of a user experience application class, a mission critical application class, or a responsiveness application class; or the first application is of a user experience application class, and the second application is of a mission critical application class.

Example 13 may include a method for controlling a power consumption by a power control unit of a computer device with one or more processors, comprising: receiving a first power information including a first priority information for a first application to be operated on the one or more processors; receiving a second power information including a second priority information for a second application to be operated on the one or more processors, wherein the first priority information is different from the second priority information; determining to control a first power consumption of the one or more processors based on the first power information for the first application; and determining to control a second power consumption of the one or more processors based on the second power information for the second application.

Example 14 may include the method of example 13, wherein the first priority information is to indicate that the first application is of a power class selected from a quality of service application class, a background application class, a user experience application class, a mission critical application class, or a responsiveness application class.

Example 15 may include the method of any one of examples 13-14, wherein the first application includes a thread of a program for gathering data, a thread of a program for downloading traffic information, a thread of a program for in-vehicle infotainment, a thread of a program for assisted driving, a thread of a program for controlling an instrument panel, a thread of a program for controlling a camera, or a thread of a program for controlling a sensor.

Example 16 may include the method of any one of examples 13-14, wherein the first power information further includes a minimal allowable voltage, a maximal allowable voltage, a minimal allowable frequency, or a maximal allowable frequency.

Example 17 may include the method of any one of examples 13-14, wherein the determining to control the first power consumption of the one or more processors based on the first power information for the first application includes determining to control the first power consumption based on the first power information by controlling a power source to supply the one or more processors to operate the first application, or by controlling an operating frequency or a voltage of the one or more processors to operate the first application.

Example 18 may include the method of any one of examples 13-14, wherein the first power information including the first priority information for the first application is assigned by a scheduler of an operating system for the computer device, and the first power information is stored in a control register in the one or more processors.

Example 19 may include the method of any one of examples 13-14, further comprising: detecting a power, thermal, or maximal current limit for the one or more processors; reducing the first power consumption of the one or more processors to operate the first application before reducing the second power consumption of the one or more processors to operate the second application, wherein the first priority information included in the first power information for the first application is lower than the second priority information included in the second power information for the second application.

Example 20 may include the method of example 19, wherein the first application is of a background application class, and the second application is of a user experience application class, a mission critical application class, or a responsiveness application class; or the first application is of a user experience application class, and the second application is of a mission critical application class.

Example 21 may include one or more non-transitory computer-readable media comprising instructions that cause a power control unit of a computer device, in response to execution of the instructions by the power control unit, to operate the power control unit to: receive a first power information including a first priority information for a first application to be operated on one or more processors of the computer device, and a second power information including a second priority information for a second application to be operated on the one or more processors, wherein the first priority information is different from the second priority information; determine to control a first power consumption based on the first power information for the first application, and to control a second power consumption based on the second power information for the second application.

Example 22 may include the one or more non-transitory computer-readable media of example 21, wherein the first priority information is to indicate that the first application is of a power class selected from a quality of service application class, a background application class, a user experience application class, a mission critical application class, or a responsiveness application class.

Example 23 may include the one or more non-transitory computer-readable media of any one of examples 21-22, wherein the first power information further includes a minimal allowable voltage, a maximal allowable voltage, a minimal allowable frequency, or a maximal allowable frequency.

Example 24 may include the one or more non-transitory computer-readable media of any one of examples 21-22, wherein the first application includes a thread of a program for gathering data, a thread of a program for downloading traffic information, a thread of a program for in-vehicle infotainment, a thread of a program for assisted driving, a thread of a program for controlling instrument panel, a thread of a program for controlling a camera, or a thread of a program for controlling a sensor.

Example 25 may include the one or more non-transitory computer-readable media of any one of examples 21-22, wherein the first power information including the first priority information for the first application is assigned by a scheduler of an operating system for the computer device.

Example 26 may include one or more computer-readable media having instructions for a computer device to handle errors, upon execution of the instructions by one or more processors, to perform the method of any one of examples 13-20.

Example 27 may include an apparatus for controlling a power consumption by a power control unit of a computer device with one or more processors, comprising: means for receiving a first power information including a first priority information for a first application to be operated on the one or more processors; means for receiving a second power information including a second priority information for a second application to be operated on the one or more processors, wherein the first priority information is different from the second priority information; means for determining to control a first power consumption of the one or more processors based on the first power information for the first application; and means for determining to control a second power consumption of the one or more processors based on the second power information for the second application.

Example 28 may include the apparatus of example 27, wherein the first priority information is to indicate that the first application is of a power class selected from a quality of service application class, a background application class, a user experience application class, a mission critical application class, or a responsiveness application class.

Example 29 may include the apparatus of example 27, wherein the first application includes a thread of a program for gathering data, a thread of a program for downloading traffic information, a thread of a program for in-vehicle infotainment, a thread of a program for assisted driving, a thread of a program for controlling an instrument panel, a thread of a program for controlling a camera, or a thread of a program for controlling a sensor.

Example 30 may include the apparatus of any one of examples 27-29, wherein the first power information further includes a minimal allowable voltage, a maximal allowable voltage, a minimal allowable frequency, or a maximal allowable frequency.

Example 31 may include the apparatus of any one of examples 27-29, wherein the means for determining to control the first power consumption of the one or more processors based on the first power information for the first application includes means for determining to control the first power consumption based on the first power information by controlling a power source to supply the one or more processors to operate the first application, or by controlling an operating frequency or a voltage of the one or more processors to operate the first application.

Example 32 may include the apparatus of any one of examples 27-29, wherein the first power information including the first priority information for the first application is assigned by a scheduler of an operating system for the computer device, and the first power information is stored in a control register in the one or more processors.

Example 33 may include the apparatus of any one of examples 27-29, further comprising: means for detecting a power, thermal, or maximal current limit for the one or more processors; and means for reducing the first power consumption of the one or more processors to operate the first application before reducing the second power consumption of the one or more processors to operate the second application, wherein the first priority information included in the first power information for the first application is lower than the second priority information included in the second power information for the second application.

Example 34 may include the apparatus of example 33, wherein the first application is of a background application class, and the second application is of a user experience application class, a mission critical application class, or a responsiveness application class; or the first application is of a user experience application class, and the second application is of a mission critical application class.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. A computer device, comprising:
one or more processors;
a power control unit coupled to the one or more processors, wherein the power control unit is to:
receive, from a first processor of the one or more processors, a first power information of a first application that is to be operated on the first processor, wherein the first power information includes:
a field with an indication of a first priority information, wherein the first priority information indicates that the first application is part of a first application class of a plurality of application classes; and
a first plurality of additional fields wherein respective fields of the plurality of additional fields include an indication of a respective power control characteristic of a plurality of power control characteristics;
receive, from a second processor of the one or more processors, a second power information of a second application that is to be operated on the second processor, wherein the second power information includes:
a field with an indication of a second priority information, wherein the second priority information indicates that the second application is part of a second application class of the plurality of application classes; and
a second plurality of additional fields wherein respective fields of the plurality of additional fields include an indication of a respective power control characteristic of the plurality of power control characteristics;

determine to control a power consumption of the first processor according to a first power control characteristic of the plurality of power control characteristics when the first application is operated on the first processor, wherein the determination to control the power consumption of the first processor according to the first power control characteristic is based on the first priority information; and determine to control a power consumption of the second processor according to a second power control characteristic of the plurality of power control characteristics when the second application is operated on the second processor, wherein the determination to control the power consumption of the second processor according to the second power control characteristic is based on the second priority information.

2. The computer device of claim 1, wherein the plurality of fields include a field related to a minimal allowable voltage, a field related to a maximal allowable voltage, a field related to a minimum allowable frequency, and a field related to a maximal allowable frequency.

3. The computer device of claim 1, wherein respective application classes of the plurality of application classes relate to functions of an autonomous or semi-autonomous vehicle.

4. The computer device of claim 1, wherein the power control unit is to control the power consumption for the first application by controlling an operating frequency or a voltage of first processor to operate the first application.

5. The computer device of claim 1, wherein the first power information of the first application is assigned by a scheduler of an operating system for the computer device.

6. The computer device of claim 1, wherein the power control unit is to determine for the first processor to consume a fixed frequency power as indicated by the first power information to operate the first application, and wherein the first priority information of the first power information is to indicate that the first application is of a quality of service application class.

7. The computer device of claim 1, wherein the power control unit is further to facilitate consumption, by the one or more processors, of power at a lowest possible frequency allowable by the power control unit to operate the first application, wherein the indication of the first application class of the first power information is to indicate that the first application is of a background application class.

8. The computer device of claim 1, wherein the computer device is an in-vehicle automotive system, a wearable device, a smartphone, a computer tablet, a laptop, a game controller, a set-top box, an infotainment console, or an Internet of Things (IoT) device.

9. The computer device of claim 1, wherein the power control unit is further to:

detect a power, thermal, or current limit for the one or more processors; and reduce the first power consumption to operate the first application before the power control unit is to reduce the second power consumption to operate the second application based on a detection that a priority of the first application class is lower than a priority of the second application class.

10. The computer device of claim 9, wherein the first power class is a background application class, and the second power class is a user experience application class or a responsiveness application class.

11. A method to be performed by a power control unit coupled to one or more processors, wherein the method comprises:

receiving, from a first processor of the one or more processors, a first power information of a first application that is to be operated on the first processor, wherein the first power information includes:

a field with an indication of a first priority information, wherein the first priority information indicates that the first application is part of a first application class of a plurality of application classes; and a first plurality of additional fields wherein respective fields of the plurality of additional fields include an indication of a respective power control characteristic of a plurality of power control characteristics receiving, from a second processor of the one or more processors, a second power information of a second application that is to be operated on the second processor, wherein the second power information includes:

a field with an indication of a second priority information, wherein the second priority information indicates that the second application is part of a second application class of the plurality of application classes; and a second plurality of additional fields wherein respective fields of the plurality of additional fields include an indication of a respective power control characteristic of the plurality of power control characteristics;

determining to control a power consumption of the first processor according to a first power control characteristic of the plurality of power control characteristics when the first application is operated on the first processor, wherein the determination to control the power consumption of the first processor according to the first power control characteristic is based on the first priority information; and determining to control a power consumption of the second processor according to a second power control characteristic of the plurality of power control characteristics when the second application is operated on the second processor, wherein the determination to control the power consumption of the second processor according to the second power control characteristic is based on the second priority information.

12. The method of claim 11, wherein the plurality of fields include a field related to a minimal allowable voltage, a field related to a maximal allowable voltage, a field related to a minimum allowable frequency, and a field related to a maximal allowable frequency.

13. The method of claim 11, wherein respective application classes of the plurality of application classes relate to functions of an autonomous or semi-autonomous vehicle.

14. The method of claim 11, wherein controlling the power consumption for the first application includes controlling an operating frequency or a voltage of first processor to operate the first application.

15. The method of claim 11, wherein the first power information of the first application is assigned by a scheduler of an operating system for the computer device.

16. The method of claim 11, further comprising causing the first processor to consume a fixed frequency power as indicated by the first power information to operate the first application, and wherein the first priority information of the first power information is to indicate that the first application is of a quality of service application class.

17. The method of claim 11, wherein the method further comprises:
   identifying a power, thermal, or current limit for the one or more processors; and
   reducing the first power consumption to operate the first application before the power control unit is to reduce the second power consumption to operate the second application based on a detection that a priority of the first application class is lower than a priority of the second application class.

18. A power control unit for use in an electronic device, wherein the power control unit is configured to:
   receive, from a first processor of the one or more processors, a first power information of a first application that is to be operated on the first processor, wherein the first power information includes:
      a field with an indication of a first priority information, wherein the first priority information indicates that the first application is part of a first application class of a plurality of application classes; and
      a first plurality of additional fields wherein respective fields of the plurality of additional fields include an indication of a respective power control characteristic of a plurality of power control characteristics;
   receive, from a second processor of the one or more processors, a second power information of a second application that is to be operated on the second processor, wherein the second power information includes:
      a field with an indication of a second priority information, wherein the second priority information indicates that the second application is part of a second application class of the plurality of application classes; and
      a second plurality of additional fields wherein respective fields of the plurality of additional fields include an indication of a respective power control characteristic of the plurality of power control characteristics;
   determine to control a power consumption of the first processor according to a first power control characteristic of the plurality of power control characteristics when the first application is operated on the first processor, wherein the determination to control the power consumption of the first processor according to the first power control characteristic is based on the first priority information; and
   determine to control a power consumption of the second processor according to a second power control characteristic of the plurality of power control characteristics when the second application is operated on the second processor, wherein the determination to control the power consumption of the second processor according to the second power control characteristic is based on the second priority information.

19. The power control unit of claim 18, wherein the plurality of fields include a field related to a minimal allowable voltage, a field related to a maximal allowable voltage, a field related to a minimum allowable frequency, and a field related to a maximal allowable frequency.

20. The power control unit of claim 18, wherein respective application classes of the plurality of application classes relate to functions of an autonomous or semi-autonomous vehicle.

21. The power control unit of claim 18, wherein controlling the power consumption for the first application includes controlling an operating frequency or a voltage of first processor to operate the first application.

22. The power control unit of claim 18, wherein the first power information of the first application is assigned by a scheduler of an operating system for the computer device.

23. The power control unit of claim 18, wherein the power control unit is further configured to facilitate consumption, by the first processor, of a fixed frequency power as indicated by the first power information to operate the first application, and wherein the first priority information of the first power information is to indicate that the first application is of a quality of service application class.

24. The power control unit of claim 18, wherein the power control unit is further configured to:
   identify a power, thermal, or current limit for the one or more processors; and
   reduce the first power consumption to operate the first application before the power control unit is to reduce the second power consumption to operate the second application based on a detection that a priority of the first application class is lower than a priority of the second application class.

\* \* \* \* \*